(12) United States Patent
Fujiwara

(10) Patent No.: US 10,244,075 B2
(45) Date of Patent: Mar. 26, 2019

(54) INFORMATION PROCESSING DEVICE, INFORMATION PROCESSING METHOD, PROGRAM AND STORAGE MEDIUM

(71) Applicant: Rakuten, Inc., Tokyo (JP)

(72) Inventor: Fumikazu Fujiwara, Tokyo (JP)

(73) Assignee: Rakuten, Inc., Tokyo (JP)

( * ) Notice: Subject to any disclaimer, the term of this patent is extended or adjusted under 35 U.S.C. 154(b) by 120 days.

(21) Appl. No.: 15/124,972

(22) PCT Filed: Mar. 20, 2014

(86) PCT No.: PCT/JP2014/057843
§ 371 (c)(1),
(2) Date: Sep. 9, 2016

(87) PCT Pub. No.: WO2015/140998
PCT Pub. Date: Sep. 24, 2015

(65) Prior Publication Data
US 2017/0019497 A1    Jan. 19, 2017

(51) Int. Cl.
| | |
|---|---|
| G06F 15/173 | (2006.01) |
| H04L 29/08 | (2006.01) |
| G06Q 50/10 | (2012.01) |
| G06Q 10/06 | (2012.01) |
| H04L 12/26 | (2006.01) |
| H04L 29/12 | (2006.01) |

(52) U.S. Cl.
CPC .......... H04L 67/306 (2013.01); G06Q 10/06 (2013.01); G06Q 50/10 (2013.01); H04L 43/06 (2013.01); H04L 61/1511 (2013.01)

(58) Field of Classification Search
CPC . H04L 43/06; H04L 63/1408; H04L 63/1425; H04L 67/22; H04L 67/306
USPC .................................................. 709/224, 223
See application file for complete search history.

(56) References Cited

U.S. PATENT DOCUMENTS

| | | | | |
|---|---|---|---|---|
| 2011/0320583 A1* | 12/2011 | Parker | ............. | H04H 60/32 709/224 |
| 2012/0108225 A1* | 5/2012 | Luna | ............. | H04L 12/66 455/418 |

FOREIGN PATENT DOCUMENTS

| | | |
|---|---|---|
| JP | 2009-58987 A | 3/2009 |
| JP | 2013-25708 A | 2/2013 |

\* cited by examiner

*Primary Examiner* — Benjamin M Thieu
*Assistant Examiner* — Andrew Woo
(74) *Attorney, Agent, or Firm* — Sughrue Mion, PLLC

(57) ABSTRACT

The oldest time of the times represented by the pieces of behavior time information included in the pieces of latest behavior log information respectively transmitted by the log information generation servers is detected as a most-delayed server latest log time on the basis of pieces of behavior log information and pieces of server identification information stored in a storing unit. A collection reference time based on the detected most-delayed server latest log time is set. Behavior log information including behavior time information before the collection reference time is selectively collected from among the pieces of behavior log information stored in the storing unit.

12 Claims, 10 Drawing Sheets

INFORMATION PROCESSING DEVICE, INFORMATION PROCESSING METHOD, PROGRAM AND STORAGE MEDIUM

CROSS REFERENCE TO RELATED APPLICATIONS

This application is a National Stage of International Application No. PCT/JP2014/057843 filed Mar. 20, 2014, the contents of all of which are incorporated herein by reference in their entirety.

TECHNICAL FIELD

The present invention relates to an information processing device for generating behavior history information on the basis of pieces of behavior log information respectively transmitted by log information generation servers that each generate the behavior log information about a user's behavior performed on a network, an information processing method therefor, a program for achieving the information processing device and a storage medium storing the program therein.

CITATION LIST

Patent Literature

Patent Literature 1: Japanese Unexamined Patent Application Publication No. 2013-25708
Patent Literature 2: Japanese Unexamined Patent Application Publication No. 2009-58987

BACKGROUND ART

Systems for generating history information about a particular user's behavior performed on a network are known (for example, affiliate systems disclosed in Japanese Patent Laid-Open No. 2013-25708 and No. 2009-58987). For example, in an affiliate system, pieces of behavior history information about a behavior of clicking a target advertisement and a behavior of purchasing a target product or the like are generated, and affiliate result rewards are calculated on the basis of the pieces of behavior history information or the like.

Here, such a system for generating behavior history information of a user as described above can be configured as, for example, a system including: a log information generation server that generates log information (hereinafter, referred to as "behavior log information") about a user's behavior on the basis of access from an external device such as a user terminal; and a behavior history information generation server that collects the behavior log information generated by the log information generation server to generate the behavior history information of the user.

SUMMARY OF INVENTION

Technical Problem

With regard to such a system for generating behavior history information as described above, the system including the log information generation server and the behavior history information generation server, it is discussed here that the transition is made from an old system to a new system. As described above, the log information generation server generates behavior log information about a user's behavior on the basis of access from an external device (access via a network). Hence, in order to make the transition from the old system to the new system, it is necessary to make such a change that the external device accesses not the log information generation server of the old system but the log information generation server of the new system. For this purpose, an operator of the system applies so-called domain name system (DNS) changeover. That is, the operator makes such an application that not the IP address of the old system but the IP address of the new system is associated with the current domain name (uniform resource locator (URL)). This enables the transition from the old system to the new system without changing the domain name.

As is well known, however, a reasonable length of time (a so-called DNS changeover propagation waiting period) is required until the DNS changeover is completed (the content of the application is completely propagated).

Because the old system is also continuously accessed in the DNS changeover propagation waiting period, log information about every target behavior cannot be generated in the new system. That is, lack of the behavior log information occurs in the new system, and the behavior history information cannot be properly generated.

Accordingly, the behavior history information generation server is caused to acquire the pieces of behavior log information from the log information generation servers of both the new and old systems. This can prevent the lack of the behavior log information.

Meanwhile, if the behavior history information generation server is caused to acquire the pieces of behavior log information from the log information generation servers of both the new and old systems for the purpose of preventing the lack of the behavior log information along with the DNS changeover as described above, the behavior history information generation server needs to: temporarily store the pieces of behavior log information respectively generated and transmitted by the plurality of log information generation servers, into a given storage device; collect the pieces of stored behavior log information; and generate the behavior history information. On this occasion, the behavior history information generation server generates the behavior history information at predetermined intervals, for example, every few hours. Hence, the behavior history information generation server sequentially collects the behavior log information.

However, in the case where the behavior history information generation server is caused to acquire the pieces of behavior log information respectively generated and transmitted by the plurality of log information generation servers as described above, if the temporarily stored behavior log information is simply collected, already generated behavior history information may need to be modified, and an increase in processing load may occur.

That is, when the behavior history information generation server is caused to acquire the pieces of behavior log information respectively transmitted by the plurality of log information generation servers as described above, the processing load varies among the log information generation servers. As a result, any of the log information generation servers is delayed in generation and transmission of the behavior log information. The log information generation server delayed in processing transmits log information about an older behavior to the behavior history information generation server, compared with the other servers. Under the circumstance, if all the pieces of stored behavior log information from the plurality of log information generation servers are collected, behavior log information at a behavior time to be managed for the already generated behavior history information is unfavorably included in the pieces of collected behavior log information, and the already generated behavior history information needs to be modified.

A specific example of this point is described. First, it is assumed that: at the time of an $n^{th}$ collection, the latest log in a first log information generation server is a behavior log at 12:00:00 (hour:minute:second), whereas the latest log in a second log information generation server is a behavior log at 11:50:00; and, at the time of an $n+1^{th}$ collection, the latest log in the first log information generation server is a behavior log at 12:10:00, whereas the latest log in the second log information generation server is a behavior log at 12:00:00. It is also assumed that the behavior history information is generated each time the behavior log information is collected.

In this case, the behavior history information generated in response to the $n^{th}$ collection should be information for managing the behavior history up to 12:00:00, and the behavior history information generated in response to the $n+1^{th}$ collection should be information for managing the behavior history up to 12:10:00. In the above-mentioned example, however, due to a delay in processing of the second log information generation server, the behavior log at 11:50:00 to 12:00:00 generated by the second log information generation server misses the $n^{th}$ collection, and is thus collected at the time of the $n+1^{th}$ collection. This means that behavior log information at a behavior time to be managed for the already generated behavior history information is unfavorably included in the behavior log information collected at the time of the $n+1^{th}$ collection. Consequently, in order to reflect the behavior log at 11:50:00 to 12:00:00 generated by the second log information generation server in the behavior history information generated at the time of the $n^{th}$ collection, the already generated behavior history information needs to be modified.

In the case where the behavior history information generation server is caused to acquire the pieces of behavior log information respectively generated and transmitted by the plurality of log information generation servers in this way, if how to collect the behavior log information for behavior history information generation is not taken into consideration, the already generated behavior history information needs to be modified due to the appearance of a log information generation server delayed in processing.

The present invention, which has been made in view of the above-mentioned problem, has an object to eliminate the need for such modification of behavior history information as described above and achieve a reduction in processing load, in the case where an information processing device is caused to generate the behavior history information on the basis of pieces of behavior log information respectively generated and transmitted by a plurality of log information generation servers, in order to prevent log collection omission at the time of, for example, DNS changeover.

Solution to Problem

Firstly, an information processing device according to the present invention includes: a storing unit that temporarily stores pieces of behavior log information respectively transmitted by a plurality of log information generation servers, in association with server identification information for identifying each log information generation server that transmits the corresponding behavior log information, the log information generation servers each generating behavior log information including at least behavior time information representing a time of a user's behavior performed on a network, on the basis of access from an external device via the network; a behavior history information generating unit that generates behavior history information representing a history of the behaviors, on the basis of the behavior log information collected from the storing unit; and a controlling unit. The controlling unit performs: a time detection process in which the time represented by the behavior time information included in the latest behavior log information transmitted by the log information generation server that is the most delayed in behavior log information transmission is detected as a most-delayed server latest log time on the basis of the pieces of behavior log information and the pieces of server identification information stored in the storing unit; and a selective collection process in which a collection reference time based on the most-delayed server latest log time detected in the time detection process is set, and behavior log information including behavior time information before the collection reference time is selectively collected from among the pieces of behavior log information stored in the storing unit.

This prevents newly collected behavior log information from including behavior log information at a behavior time to be managed for already generated behavior history information.

Secondly, in the above-mentioned information processing device according to the present invention, desirably, the log information generation servers include: a log information generation server of an old system that the external device no longer accesses along with DNS changeover; and a log information generation server of a new system that the external device accesses along with the DNS changeover, and the controlling unit performs: a changeover completion judging process in which it is judged whether or not any of the log information generation servers stops transmitting the behavior log information along with the DNS changeover; and a changeover completion-time handling process in which, if it is judged in the changeover completion judging process that any of the log information generation servers stops transmitting the behavior log information, the behavior log information transmitted by the log information generation server for which the most-delayed server latest log time is detected is collected from among the pieces of behavior log information stored in the storing unit, and this log information generation server is excluded from targets of the time detection process.

This can resolve stagnation of the behavior log information collection that occurs when the pieces of behavior log information from the log information generation servers of the old system are no longer accumulated in the storing unit due to completion of the DNS changeover.

Thirdly, in the above-mentioned information processing device according to the present invention, desirably, in the changeover completion-time handling process, the controlling unit collects the behavior log information transmitted by every log information generation server of the old system, and excludes every log information generation server of the old system from the targets of the time detection process.

This can suppress the stagnation of the behavior log information collection along with the completion of the DNS changeover to only once, in the case where the number of the log information generation servers of the old system is more than one.

Fourthly, in the above-mentioned information processing device according to the present invention, desirably, in the changeover completion judging process, the controlling unit judges whether or not one of the most-delayed server latest log time and the collection reference time is the same time a predetermined number of times in a row.

This eliminates the need for an additional process of monitoring the status of transmission from each log information generation server, in order to judge whether or not any of the log information generation servers stops transmitting the behavior log information along with the DNS changeover.

Moreover, an information processing method according to the present invention is an information processing method for an information processing device including: a storing unit that temporarily stores pieces of behavior log information respectively transmitted by a plurality of log information generation servers, in association with server identification information for identifying each log information generation server that transmits the corresponding behavior log information, the log information generation servers each generating the behavior log information including at least behavior time information representing a time of a user's behavior performed on a network, on the basis of access from an external device via the network; and a behavior history information generating unit that generates behavior history information representing a history of the behaviors, on the basis of the behavior log information collected from the storing unit. The information processing method includes: a time detection step in which the time represented by the behavior time information included in the latest behavior log information transmitted by the log information generation server that is the most delayed in behavior log information transmission is detected as a most-delayed server latest log time on the basis of the pieces of behavior log information and the pieces of server identification information stored in the storing unit; and a selective collection step in which a collection reference time based on the most-delayed server latest log time detected in the time detection step is set, and behavior log information including behavior time information before the collection reference time is selectively collected from among the pieces of behavior log information stored in the storing unit.

Further, a program according to the present invention is a program causing an information processing device to perform processing achieved as the above-mentioned information processing method.

Furthermore, a storage medium according to the present invention is a program medium storing the above-mentioned program therein. The above-mentioned information processing device is achieved by the program and the storage medium.

Advantageous Effects of Invention

According to the present invention, it is possible to eliminate the need for modification of already generated behavior history information and achieve a reduction in processing load, in the case where an information processing device is caused to generate the behavior history information on the basis of pieces of behavior log information respectively generated and transmitted by a plurality of log information generation servers, in order to prevent log collection omission at the time of, for example, DNS changeover.

DESCRIPTION OF EMBODIMENTS

Hereinafter, embodiment is described in the following order.

<1. Configuration of Network System>
<2. Configuration of Affiliate Management System>
<3. System Transition>
<4. Behavior history Information Generation Server of Embodiment>
<5. Processing Procedures>
<6. Conclusion of Embodiment>
<7. Program and Storage Medium>
<8. Modifications>

<1. Configuration of Network System>

Figure 1:
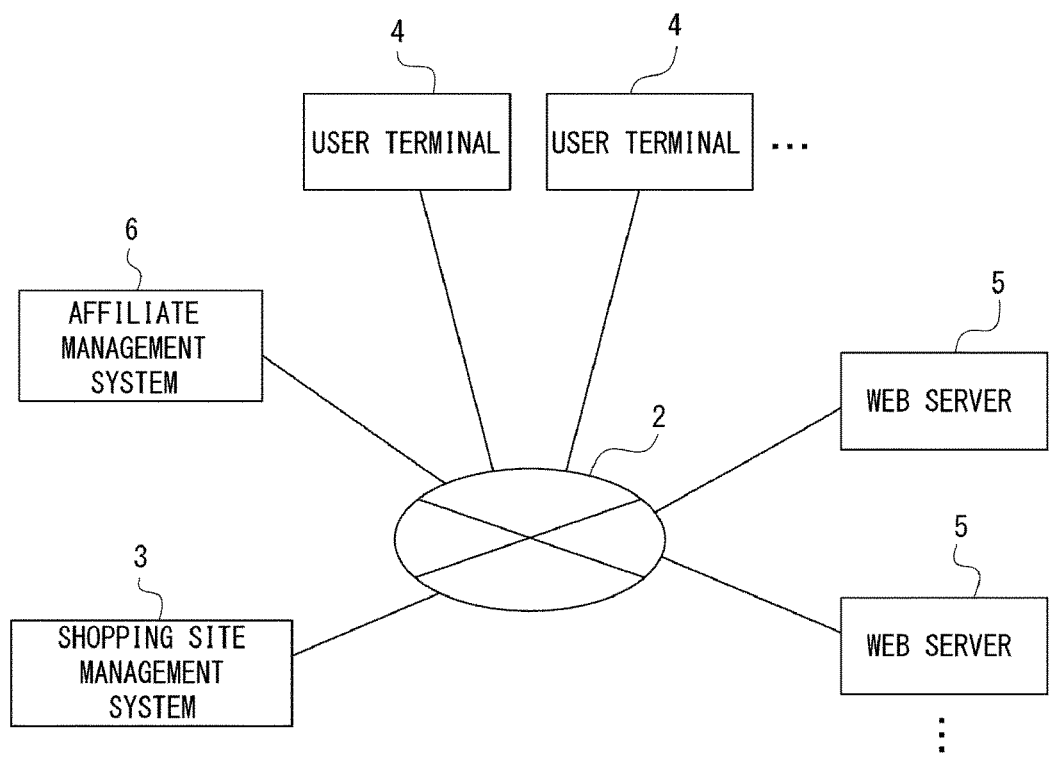
FIG. 1 is an explanatory diagram of a network system on which an embodiment is premised.

FIG. 1 illustrates an example of a network system 1 on which the present embodiment is premised. The network system 1 functions as an electronic commerce (EC) system.

In the network system 1, for example, a shopping site management system 3, a plurality of user terminals 4, 4 . . . , a plurality of web servers 5, 5 . . . , and an affiliate management system 6 are mutually communicable via a network 2 as the Internet.

In the network system 1, the shopping site management system 3 provides a website (EC site) of a virtual shopping mall to a user (a user of the user terminal 4). A plurality of shops (affiliated shops of the virtual shopping mall) exist in the EC site. A staff of each shop registers products of his/her shop via a computer device as a shop terminal (not illustrated), whereby various products of various shops are uploaded onto the EC site. The user can purchase a desired product by accessing the EC site from the user terminal 4.

Moreover, in the network system 1, the user can also access an arbitrary website such as a blog site of somebody else provided by the web server 5.

The shopping site management system 3 is one or more computer devices that provide an EC site including websites of one or more shops, to the user. The shopping site management system 3 performs various processes on the basis of a Hypertext Transfer Protocol (HTTP) request sent from the user terminal 4. Examples of the processes performed by the shopping site management system 3 include: a process of generating and transmitting various webpages (for example, a product page, a page for product search, a shopping cart page, and an order page); and a purchase process according to an order confirmation operation by the user.

The user terminal 4 is a computer device including a web browser. Examples of the user terminal 4 include a sophisticated mobile phone (smartphone), a mobile phone, a personal digital assistant (PDA), and a mobile or stationary personal computer (PC), and the type of the user terminal 4 is not limited thereto.

The user terminal 4 transmits a HTTP request to the shopping site management system 3, the web server 5, and the affiliate management system 6 to thereby request a webpage and a predetermined process. Moreover, the user terminal 4 receives a webpage sent in response to the HTTP request, and displays the webpage onto the web browser. This enables the user to browse and operate a desired webpage.

Note that, when the user uses an EC site, the user can register as a member to the shopping site management system 3. At the time of the member registration, the user registers necessary information such as a user ID (user identification information), a product delivery address, and a credit card number. The user logs in to the EC site using the registered user ID, whereby the user can save the trouble of inputting the necessary information again at the time of product purchase on the EC site.

Here, in the user terminal 4, the user ID inputted for the log-in can be stored in a cookie of the web browser of the user terminal 4.

The web server 5 is one or more computer devices that provide an arbitrary website to the user.

In the present embodiment, a so-called affiliate link is presented (displayed) on a website provided by a given web server 5 of the web servers 5. In the case of this example, the affiliate link is presented on the website in the form of a banner advertisement. The affiliate link is a link for enabling a user who clicks this link to access the webpage of a particular shop in the EC site provided by the shopping site management system 3 or the webpage of a particular product of the shop.

The affiliate link is provided with a uniform resource locator (URL) of the link destination, a link ID (advertisement ID) for identifying this affiliate link from among other affiliate links, and a shop ID for identifying a shop (advertiser) that requests the presentation of this affiliate link.

A code (control program) is embedded in the affiliate link, the code being for causing the user terminal 4 to transmit the link ID, the shop ID, and the click time (behavior time) to the affiliate management system 6 in response to a click of this affiliate link.

The user clicks an affiliate link presented on a website of somebody else provided by the web server 5, whereby the user can access a particular webpage in an EC site to purchase a desired product.

If the user accesses an EC site via an affiliate link to purchase a product in a shop in the EC site, the shop that sells the product pays a predetermined reward to a link agent (advertisement agent) that presents the affiliate link on a website.

The affiliate management system 6 generates log information (hereinafter, referred to as "behavior log information") about a user's behavior concerning an affiliate, specifically, a behavior of clicking an affiliate link and a behavior of purchasing a particular product, generates behavior history information representing the history of user's behaviors on the basis of the behavior log information, and calculates a reward (affiliate result reward) to the link agent on the basis of the behavior history information.

In the present embodiment, the affiliate management system 6 includes a plurality of computer devices serving as: a server device (a log information generation server 10 to be described later) that generates the behavior log information; a server device (a behavior history information generation server 11 to be described later) that generates the behavior history information on the basis of the behavior log information; and a server device (a result reward management server 12 to be described later) that calculates the affiliate result reward on the basis of the behavior history information.

A general outline of a process of generating the behavior log information in the network system 1 is described with reference to a flowchart of FIG. 2.

Figure 2:
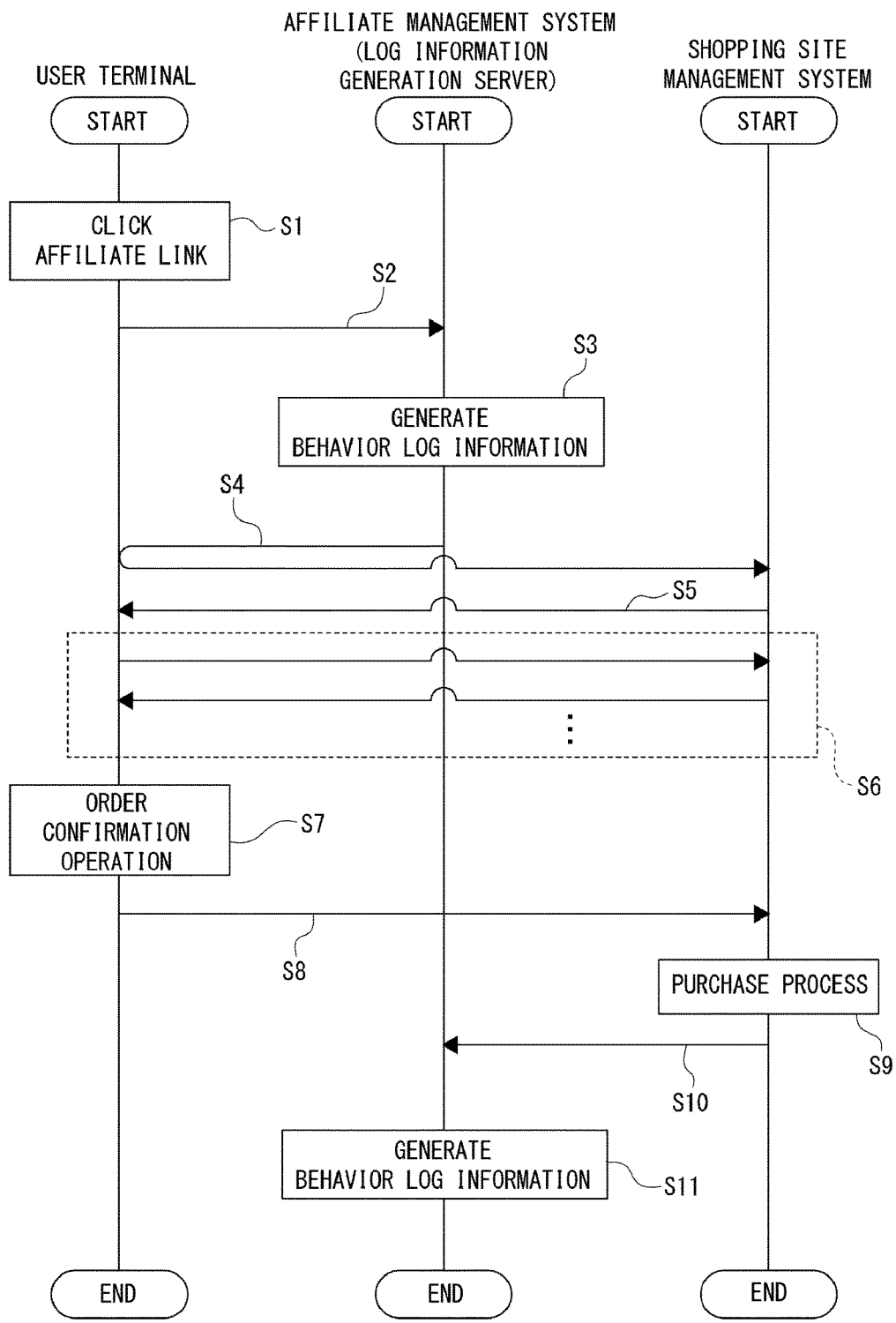
FIG. 2 is a flowchart for describing a general outline of a process of generating behavior log information.

In FIG. 2, if the user clicks an affiliate link on an arbitrary webpage (Step S1), the user terminal 4 transmits: a link ID; a shop ID; a user ID; behavior identification information for identifying a behavior (in this case, information representing a behavior as "click"); and information on date and time at which the click operation is performed (behavior time information), to the affiliate server 10 in accordance with a code provided to the clicked affiliate link (Step S2).

In response to this, the affiliate management system 6 (log information generation server 10) generates behavior log information in which the link ID, the shop ID, the user ID, the behavior identification information, and the behavior time information are associated with one another (Step S3).

Here, in the case of this example, in order to enable the affiliate management system 6 to perform logging of the user's click behavior as described above, the affiliate link is provided with the URL of the affiliate management system 6 as a link-destination URL.

In response to that the user terminal 4 accesses the affiliate management system 6 in response to the click of the affiliate link as described above, the affiliate management system 6 redirects the user terminal 4 to a particular webpage in an EC site corresponding to the clicked affiliate link (Step S4).

In response to a HTTP request from the user terminal 4 as a result of the redirection, the shopping site management system 3 generates the particular webpage corresponding to the clicked affiliate link, and transmits the particular webpage to the user terminal 4 (Step S5).

After that, HTTP requests and webpages corresponding to the requests are exchanged between the user terminal 4 and the shopping site management system 3 (Step S6).

Note that a series of processes corresponding to Steps S1 to S5 may be performed in Step S6, if the user clicks another affiliate link.

After that, if the user performs an operation of confirming the order for a particular product of a particular shop (Step S7), a HTTP request corresponding to the operation is transmitted to the shopping site management system 3 (Step S8), and the shopping site management system 3 performs a purchase process (Step S9).

Upon completion of the purchase process, the shopping site management system 3 accesses the affiliate management system 6 and issues a purchase notice (Step S10). The purchase notice includes: a product ID for identifying the purchased product (the product for which the order is confirmed); a shop ID of the shop from which the product is purchased; a user ID of the purchaser; purchase price information of the product; behavior identification information (in this case, information representing a behavior as "purchase"); and behavior time information representing the purchase date and time (order confirmation date and time) of the product.

In response to the purchase notice from the shopping site management system 3, the affiliate management system 6 generates behavior log information (Step S11). Specifically, the affiliate management system 6 generates behavior log information in which the product ID, the shop ID, the user ID, the purchase price information, the behavior identification information, and the behavior time information included in the purchase notice are associated with one another.

Note that the purchase notice may be issued by the user terminal 4. That is, for example, a code is embedded in a webpage as an order confirmation screen, and the user terminal 4 accesses the affiliate management system 6 and issues the purchase notice in accordance with the embedded code.

FIG. 2 illustrates a hardware configuration of a computer device (information processing device) forming each of the shopping site management system 3, the user terminal 4, the web server 5, and the affiliate management system 6 illustrated in FIG.

Figure 3:
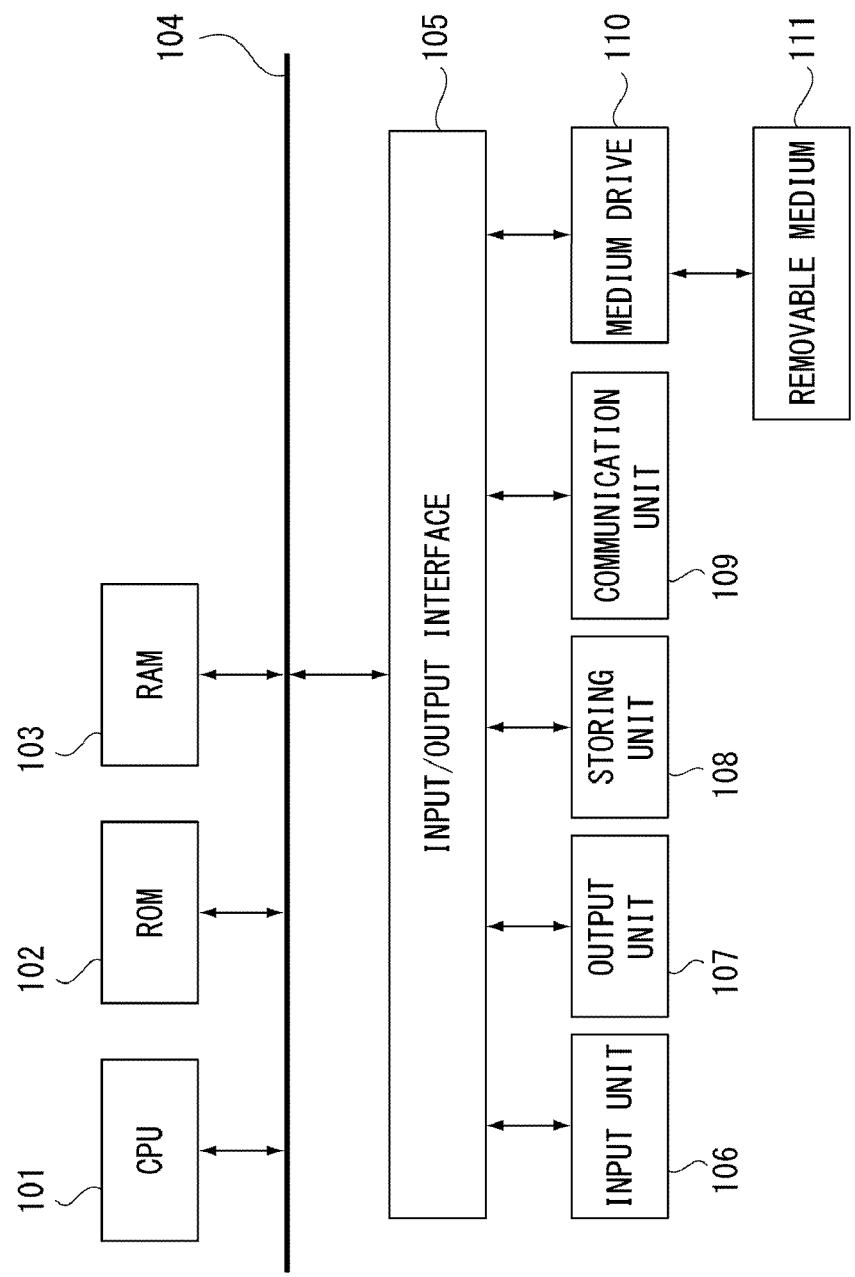
FIG. 3 is a block diagram of a computer device of the embodiment.

In FIG. 3, a central processing unit (CPU) 101 of the computer device performs various processes in accordance with programs stored in a read only memory (ROM) 102 or programs that are loaded from a storing unit 108 onto a random access memory (RAM) 103. Data necessary for the CPU 101 to perform various processes is also stored in the RAM 103 as appropriate.

The CPU 101, the ROM 102, and the RAM 103 are mutually connected via a bus 104. An input/output interface 105 is also connected to the bus 104.

An input unit 106, an output unit 107, the storing unit 108, and a communication unit 109 are connected to the input/output interface 105. The input unit 106 includes a keyboard, a mouse, and a touch panel. The output unit 107 includes: a display such as a liquid crystal display (LCD), a cathode ray tube (CRT), and an organic electroluminescence (EL) panel; and a speaker. The storing unit 108 includes a hard disk drive (HDD) and a flash memory device. The communication unit 109 performs communication processing and inter-device communication via the network 2.

A medium drive 110 is also connected to the input/output interface 105 as needed. A removable medium 111 such as a magnetic disk, an optical disk, a magneto-optical disk, or a semiconductor memory is attached to the medium drive 110 as appropriate, and information is written into and read out from the removable medium 111.

In the computer device thus configured, data and programs can be uploaded and downloaded through communication by the communication unit 109, and data and programs can be delivered using the removable medium 111.

When the CPU 101 performs processing operations on the basis of various programs, particularly, each computer device forming the affiliate management system 6 performs information processing and communication to be described later.

Note that each of the shopping site management system 3, the user terminal 4, the web server 5, and the affiliate management system 6 may be formed by such a computer device as illustrated in FIG. 3 alone, and may be formed by a plurality of systematized computer devices. The plurality of computer devices may be systematized via a LAN or like, and may be arranged in remote places via a virtual private network (VPN) or like using the Internet or like.

<2. Configuration of Affiliate Management System>

A configuration of the affiliate management system 6 is described with reference to FIG. 4.

Figure 4:
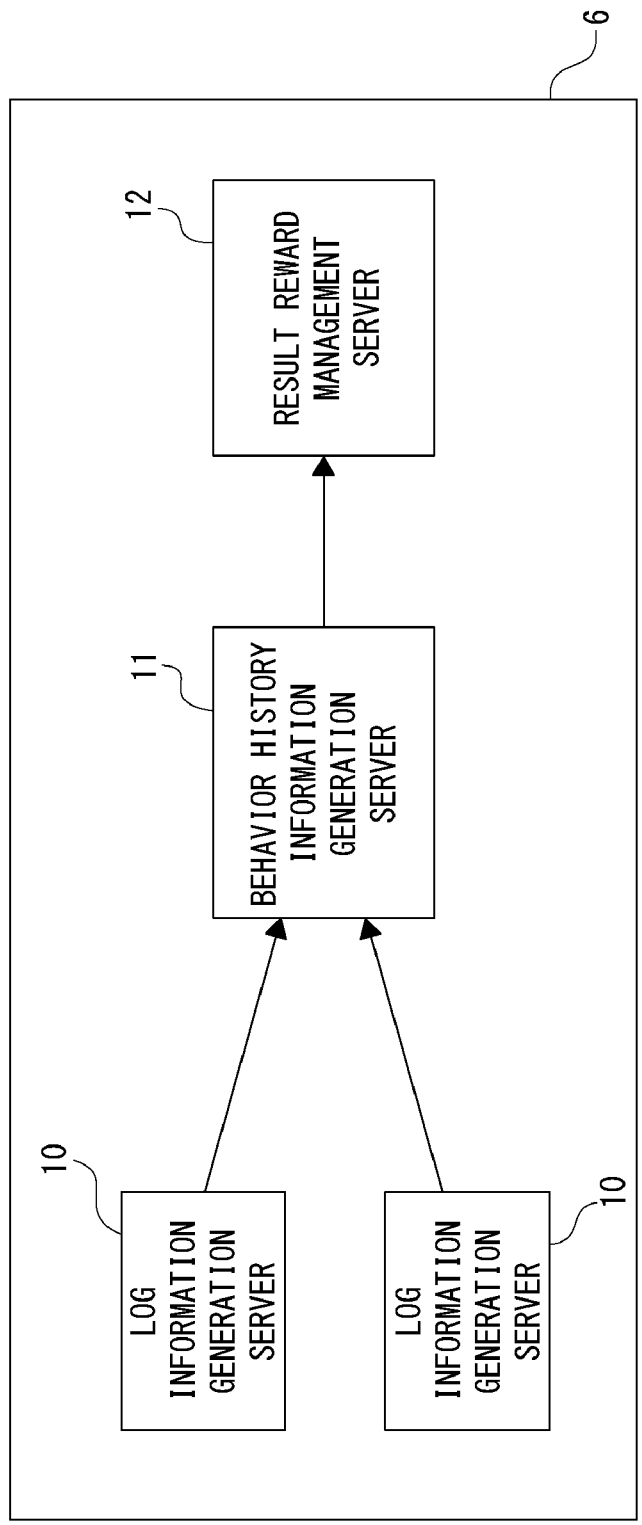
FIG. 4 is a block diagram of an affiliate management system of the embodiment.

As illustrated in FIG. 4, the affiliate management system 6 includes the log information generation servers 10, the behavior history information generation server 11, and the result reward management server 12.

The number of the log information generation servers 10 included in the affiliate management system 6 in this case is more than one for the purpose of, for example, distributing a load of a process of generating behavior log information. As illustrated in FIG. 4, in this example, the number of the log information generation servers 10 is two.

Although not illustrated, the affiliate management system 6 in this case includes a load balancer in the previous stage of the log information generation servers 10, and the load balancer distributes accesses from external devices (in this example, the user terminals 4 and the shopping site management system 3) to the log information generation servers 10. The URL of the load balancer is set as the URL provided to the affiliate link and the URL that is referred to when the shopping site management system 3 issues the purchase notice.

On the basis of access from an external device via the network, the log information generation server 10 generates behavior log information including at least behavior time information representing the time of a user's behavior performed on the network. Specifically, the log information generation server 10 in this example generates: the behavior log information that is based on the access from the user terminal 4 in response to the click of the affiliate link (the behavior log information in which the link ID, the shop ID, the user ID, the behavior identification information, and the behavior time information are associated with one another) as described above; and the behavior log information that is based on the access along with the purchase notice from the shopping site management system 3 (the behavior log information in which the product ID, the shop ID, the user ID, the purchase price information, the behavior identification information, and the behavior time information are associated with one another) as described above.

The log information generation server 10 transmits the generated behavior log information to the behavior history information generation server 11. At this time, the log information generation server 10 adds a server ID (server identification information) for identifying this log information generation server 10, as a transmitter server ID to the behavior log information, and transmits the behavior log information to the behavior history information generation server 11.

The behavior history information generation server 11 temporarily stores the behavior log information transmitted by the log information generation server 10, in association with the transmitter server ID of the log information generation server 10 that transmits this behavior log information. The behavior history information generation server 11 collects the stored behavior log information, and generates behavior history information representing the history of user's behaviors.

The behavior history information is generated such that the history of behaviors can be sorted for each item such as the user ID, the link ID, the behavior time, and the product ID.

The behavior history information generation server 11 transmits the generated behavior history information to the result reward management server 12.

The result reward management server 12 calculates a reward (affiliate result reward) to the link agent on the basis of the behavior history information transmitted by the behavior history information generation server 11.

The result reward management server 12 stores information on the calculated result reward in association with at least information for identifying the link agent.

The information on the result reward thus stored is read out as needed to be used for a process of paying the affiliate result reward.

<3. System Transition>

The present embodiment is based on the premise that the transition of the affiliate management system 6 is made from an old system to a new system in the network system 1 illustrated in FIG. 1. As described above, in order to make the transition from the old system to the new system, domain name system (DNS) changeover needs to be applied to make such a change that an external device accesses not the log information generation server 10 of the old system but the log information generation server 10 of the new system. In a DNS changeover propagation waiting period after the DNS changeover is applied, both the old system and the new system are accessed. Hence, lack of the behavior log information occurs in the new system, and the behavior history information cannot be properly generated.

Figure 5:
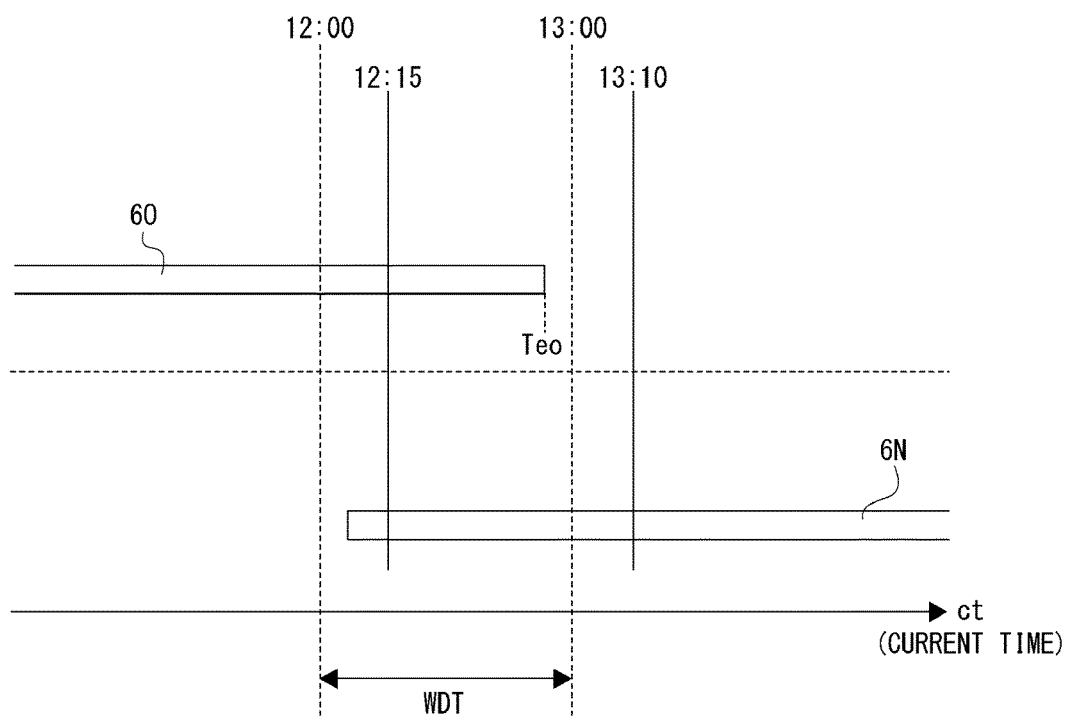
FIG. 5 is an explanatory diagram for lack of the behavior log information that occurs along with DNS changeover.

FIG. 5 is an explanatory diagram for the lack of the behavior log information that occurs along with the DNS changeover.

In FIG. 5, the horizontal axis represents a current time ct, and the status of access to each of the old system and the new system in the DNS changeover propagation waiting period (hereinafter, referred to as "period WDT") and periods before and after the period WDT is schematically illustrated. In FIG. 5, "6O" represents the period in which the affiliate management system 6 as the old system is accessed, and "6N" represents the period in which the affiliate management system 6 as the new system is accessed.

In FIG. 5, the period WDT is a period of one hour from 12:00:00 (hour:minute:second) to 13:00:00 for ease of description.

In the period from application of the DNS changeover to complete propagation of the content thereof, one user terminal 4 may access the old system, and another user terminal 4 may access the new system. That is, both the new and old systems may be accessed by the external devices. In FIG. 5, a time point at which the old system is no longer accessed is represented as "time Teo".

The new system cannot generate the behavior log information about access that is made to the old system up to the time Teo. Accordingly, the lack of the behavior log information occurs in the new system.

In order to prevent such lack of the behavior log information as described above, the behavior history information generation server 11 is caused to acquire the pieces of behavior log information from the log information generation servers 10 of both the new and old systems.

Figure 6:
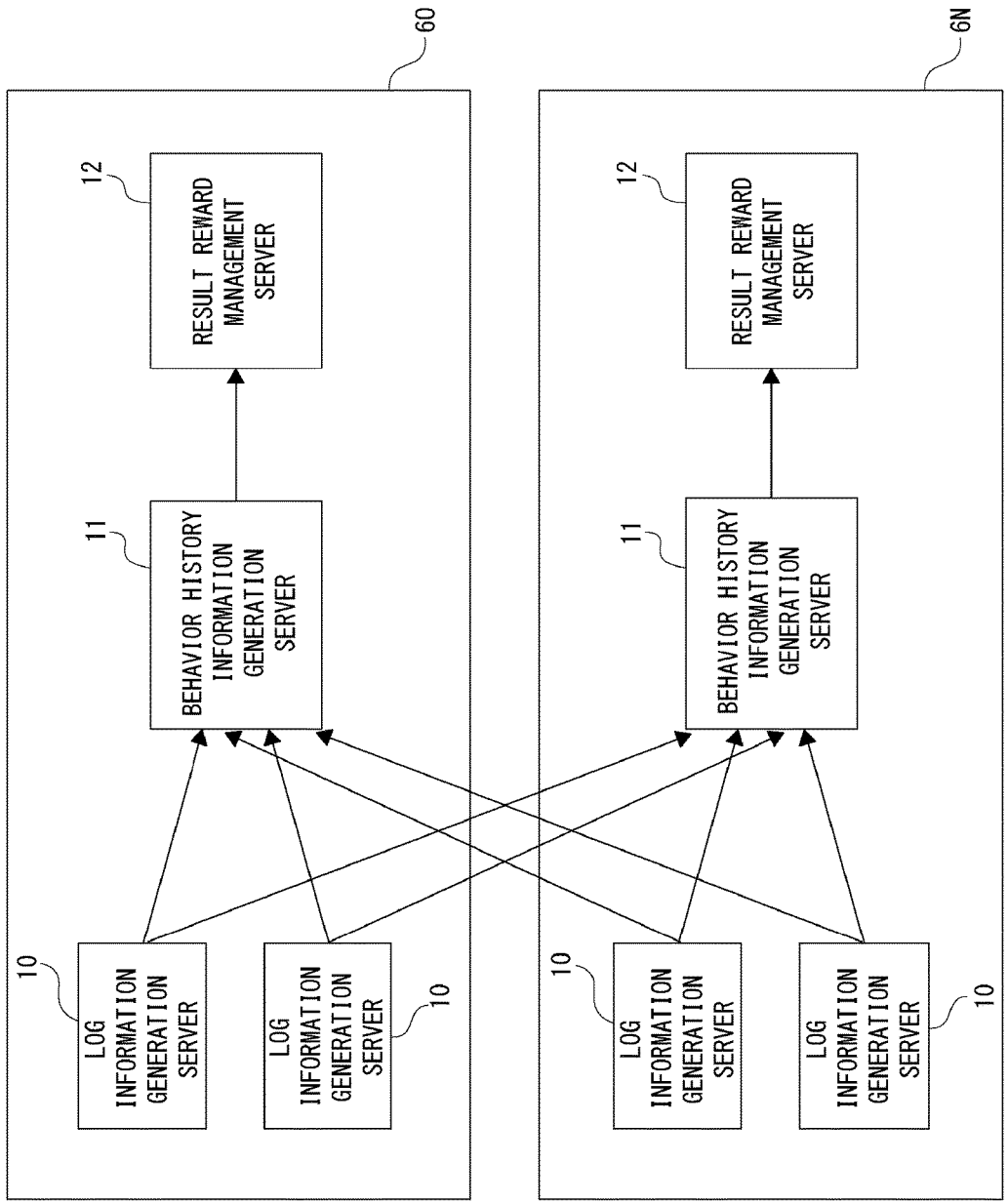
FIG. 6 is a diagram illustrating a relation between new and old affiliate management systems.

FIG. 6 illustrates a relation between the affiliate management system 6 as the old system (hereinafter, referred to as "affiliate management system 6O") and the affiliate management system 6 as the new system (hereinafter, referred to as "affiliate management system 6N") in this case.

In this case, the log information generation server 10 of the affiliate management system 6O transmits the generated behavior log information (and the transmitter server ID) to the behavior history information generation server 11 of the affiliate management system 6O, and also transmits the same to the behavior history information generation server 11 of the affiliate management system 6N. Similarly, the log information generation server 10 of the affiliate management system 6N transmits the generated behavior log information (and the transmitter server ID) to the behavior history information generation server 11 of the affiliate management system 6N, and also transmits the same to the behavior history information generation server 11 of the affiliate management system 6O.

Note that, in this example, not only the behavior history information generation server 11 of the new system but also the behavior history information generation server 11 of the old system is caused to acquire the pieces of behavior log information from the log information generation servers 10 of both the new and old systems, and this can prevent the lack of the behavior log information from occurring along with the DNS changeover also in the old system.

Here, as described above, in order to prevent the lack of the behavior log information from occurring along with the DNS changeover, the behavior history information generation server 11 is caused to acquire the pieces of behavior log information from the log information generation servers 10 of both the new and old systems.

However, in the case where the behavior history information generation server 11 is caused to acquire the pieces of behavior log information from the plurality of log information generation servers 10 in this way, as described above, if how to collect the behavior log information is not taken into consideration, the behavior history information generation server 11 may need to modify already generated behavior history information, and an increase in processing load may occur.

<4. Behavior history Information Generation Server of Embodiment>

In view of the above, in the present embodiment, the behavior history information generation server 11 is configured in the following manner.

Figure 7:
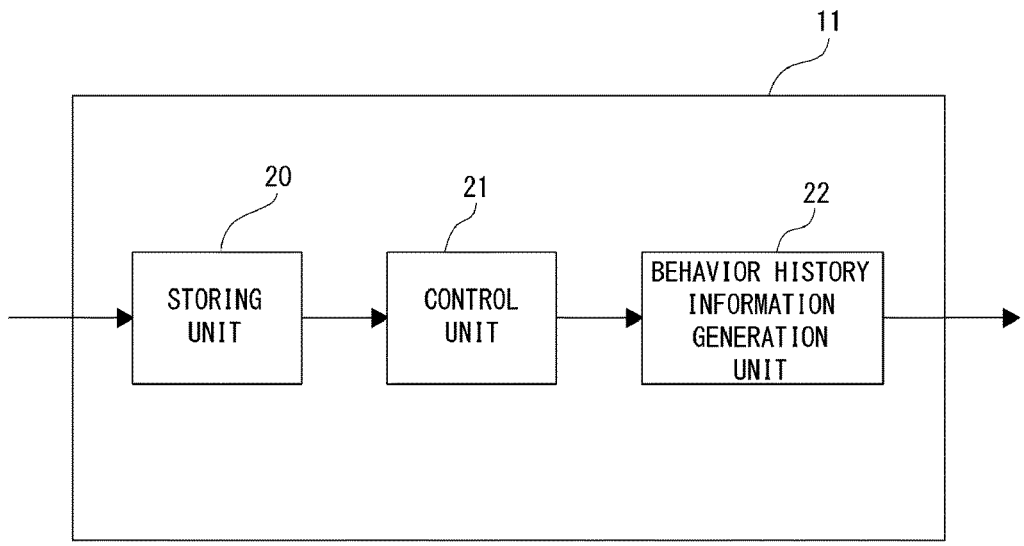
FIG. 7 is a block diagram of a behavior history information generation server (information processing device) of the embodiment.

FIG. 7 is a block diagram of the behavior history information generation server 11 of the embodiment The behavior history information generation server 11 of the embodiment includes a storing unit 20, a controlling unit 21, and a behavior history information generating unit 22.

The storing unit 20 temporarily stores the pieces of behavior log information respectively transmitted by: the log information generation server 10 of the affiliate management system 6O as the old system; and the log information generation server 10 of the affiliate management system 6N as the new system, in association with the transmitter server ID of each log information generation server 10 that transmits the corresponding behavior log information.

The controlling unit 21 collects the pieces of behavior log information stored in the storing unit 20 for the purpose of generating the behavior history information. The controlling unit 21 of the present embodiment does not collect all pieces of uncollected behavior log information stored in the storing unit 20, but selects pieces of collection-target behavior log information on the basis of the pieces of behavior log information and the transmitter server IDs stored in the storing unit 20. This point is described later.

The behavior history information generating unit 22 generates the behavior history information on the basis of the behavior log information collected by the controlling unit 21, and transmits the generated behavior history information to the result reward management server 12. On this occasion, the transmission destination of the behavior history information is the result reward management server 12 of the affiliate management system 6O if this behavior history information generating unit 22 is included in the affiliate management system 6O, and is the result reward management server 12 of the affiliate management system 6N if this behavior history information generating unit 22 is included in the affiliate management system 6N.

Note that, compared with the hardware configuration illustrated in FIG. 3, a function as the storing unit 20 is achieved by processing and control of the storing unit 108 and the CPU 101, and functions as the controlling unit 21 and the behavior history information generating unit 22 are each achieved by processing and control of the CPU 101

Figure 8:
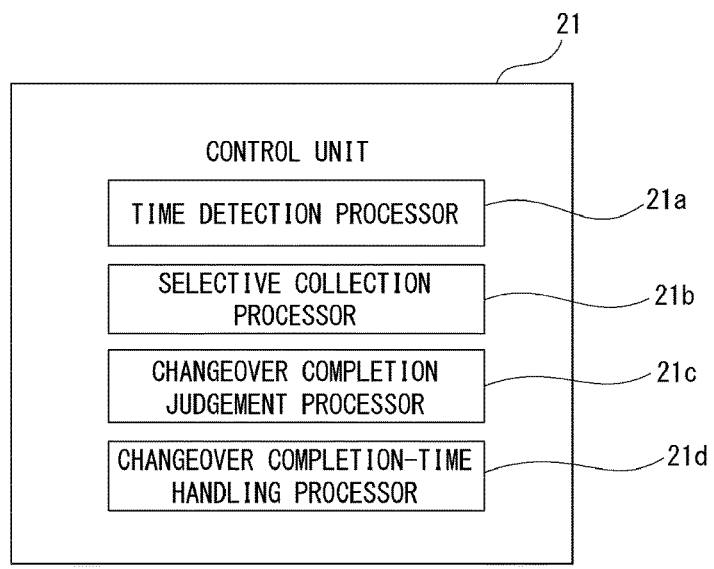
FIG. 8 is a diagram illustrating, in the form of blocks, functions of a controlling unit of the behavior history information generation server of the embodiment.

FIG. 8 illustrates functions of the controlling unit 21 in the form of blocks.

As illustrated in FIG. 8, the controlling unit 21 can be divided into functional blocks of a time detection processor 21a, a selective collection processor 21b, a changeover completion judgment processor 21c, and a changeover completion-time handling processor 21d.

The time detection processor 21a detects a most-delayed server latest log time DT on the basis of the pieces of behavior log information and the transmitter server IDs stored in the storing unit 20. The most-delayed server latest log time DT means the time represented by the behavior time information included in the latest behavior log information transmitted by the log information generation server 10 that is the most delayed in behavior log information transmission.

The selective collection processor 21b sets a collection reference time RT based on the most-delayed server latest log time DT detected by the time detection processor 21a, and selectively collects behavior log information including behavior time information before the collection reference time RT, from among the pieces of behavior log information stored in the storing unit 20.

Here, significance of processes performed by the time detection processor 21a and the selective collection processor 21b is described with reference to FIGS. 9A and 9B.

Figure 9A:
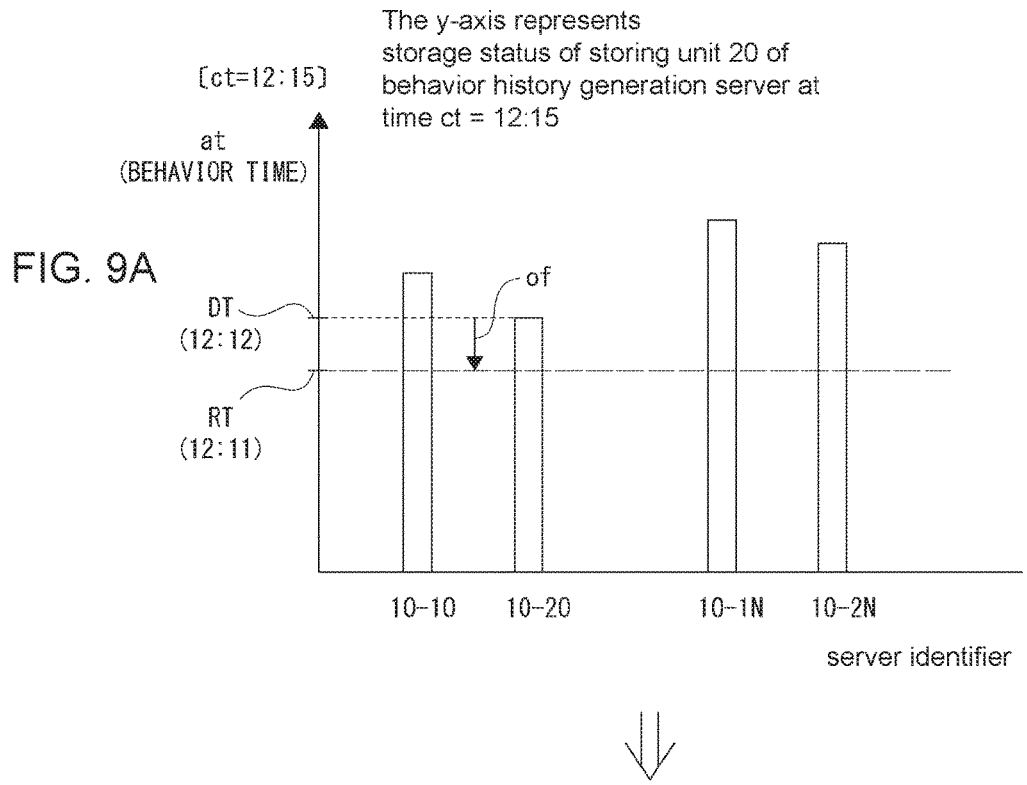
FIGS. 9A and 9B are explanatory diagrams for significance of processes performed by a time detection processor and a selective collection processor.
Figure 9B:
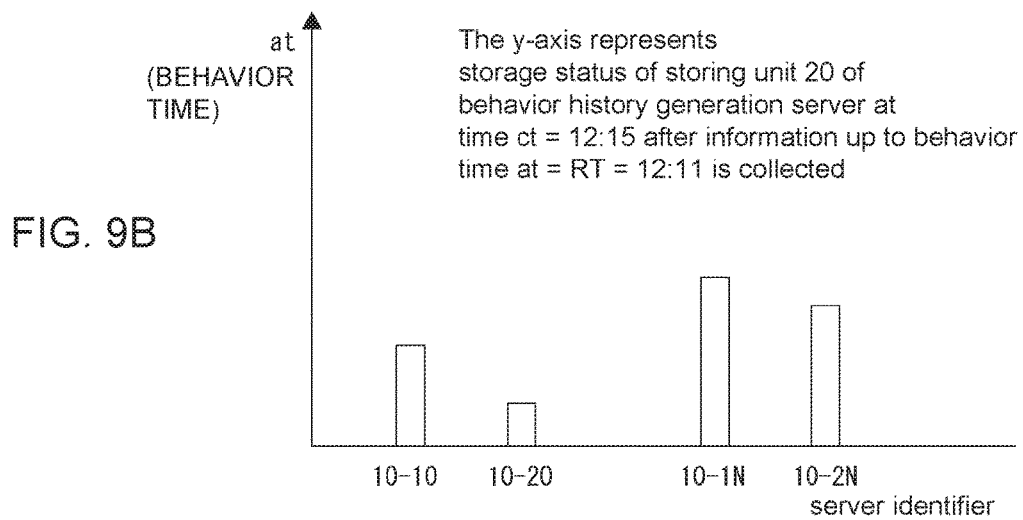

In FIG. 9A and FIG. 9B, the vertical axis represents a behavior time at, and the storage status in the storing unit 20, of the behavior log information transmitted by each log information generation server 10 is schematically illustrated. In FIG. 9A and FIG. 9B, "10-1o" represents one of the log information generation servers 10 of the affiliate management system 60, "10-2o" represents another of the log information generation servers 10 of the affiliate management systems 60, "10-1n" represents one of the log information generation servers 10 of the affiliate management system 6N, and "10-2n" represents another of the log information generation servers 10 of the affiliate management system 6N. FIG. 9A and FIG. 9B illustrate the storage status of the behavior log information in the storing unit 20 for each log information generation server 10.

Note that FIG. 9A and FIG. 9B illustrate the storage status at the current time ct =12:15:00 on the premise of the period WDT (12:00:00 to 13:00:00) illustrated in FIG. 5.

In the case where the pieces of behavior log information are acquired from the plurality of log information generation servers 10, the processing load varies among the log information generation servers 10. As a result, any of the log information generation servers 10 is more delayed in processing than the other log information generation servers 10. The log information generation server 10 delayed in processing transmits older behavior log information than the other log information generation servers 10.

Consequently, as illustrated in FIG. 9A and FIG. 9B, the behavior time at of the latest behavior log information in the storing unit 20 varies among the log information generation servers 10.

Under such a storage status in the storing unit 20 as described above, the time detection processor 21a detects the most-delayed server latest log time DT on the basis of the pieces of behavior log information and the transmitter server IDs respectively associated with the pieces of behavior log information stored in the storing unit 20. In FIG. 9A and FIG. 9B, the server that is the most delayed in processing (namely, the server for which the time represented by the behavior time information included in the latest behavior log information is the oldest time) is the log information generation server 10-2o. Accordingly, the time represented by the behavior time information included in the latest behavior log information transmitted by the log information generation server 10-2o is detected as the most-delayed server latest log time DT.

If the time detection processor 21a detects the most-delayed server latest log time DT in this way, the selective collection processor 21b sets the collection reference time RT based on the most-delayed server latest log time DT, and selectively collects behavior log information including behavior time information before the collection reference time RT, from among the pieces of behavior log information stored in the storing unit 20.

In the case of this example, the selective collection processor 21b sets a time that is older by a predetermined offset time of than the most-delayed server latest log time DT, as the collection reference time RT. Specifically, the offset time of is set to, for example, one minute. In the case where the most-delayed server latest log time DT=12:12:00 as in the example of FIG. 9A, the collection reference time RT is set to 12:11:00.

FIG. 9B illustrates the storage status of the behavior log information in the storing unit 20 after the behavior log information including the behavior time information before the collection reference time RT thus set is collected.

The time detection processor 21a and the selective collection processor 21b repetitively perform such detection of the most-delayed server latest log time DT and such behavior log information collection based on the collection reference time RT, at intervals of a predetermined time.

According to the above-mentioned collecting method, the range of the collect-target behavior time at is equalized for all the log information generation servers 10. Specifically, the range thereof is equalized to the range from the collection reference time RT set at the time of previous collection to the behavior time at before the collection reference time RT set at the time of this-time collection.

Consequently, newly collected behavior log information does not include behavior log information at a behavior time to be managed for already generated behavior history information.

Accordingly, the already generated behavior history information does not need to be modified, and a reduction in processing load can be achieved.

Here, if sequential collection of the pieces of behavior log information stored in the storing unit 20 is continued according to the above-mentioned collecting method, the behavior log information collection becomes stagnant after completion of the DNS changeover.

Figure 10:
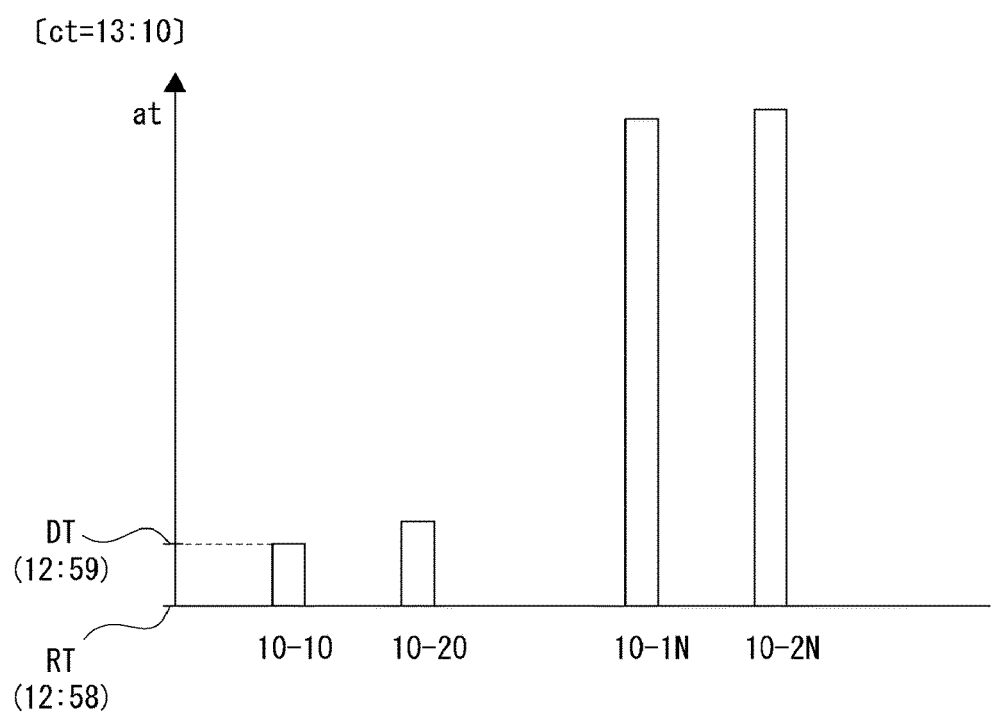
FIG. 10 is a diagram schematically illustrating the storage status of the behavior log information in a storing unit in the case where behavior log information collection becomes stagnant along with completion of the DNS changeover.

FIG. 10 schematically illustrates the storage status of the behavior log information in the storing unit 20 in the case where the behavior log information collection becomes stagnant along with the completion of the DNS changeover.

Note that FIG. 10 illustrates the storage status at the current time ct=13:10:00 on the premise of the period WDT illustrated in FIG. 5. Also in FIG. 10, the storage status is expressed in the same manner as in FIG. 9A and FIG. 9B.

If the log information generation servers 10-1o and 10-2o of the affiliate management system 6O no longer generate and transmit the behavior log information due to the completion of the DNS changeover, thereafter, the pieces of behavior log information from the log information generation servers 10-1o and 10-2o are no longer newly stored into the storing unit 20.

If the pieces of behavior log information from the log information generation servers 10-1o and 10-2o are no longer newly stored, even if the log information generation server 10-1n or 10-2n of the new system (6N) has been delayed in processing until then, the accumulation amount (storage amount) of behavior log information from any of the log information generation servers 10-1o and 10-2o becomes the smallest at a given time point after then. That is, the time represented by the behavior time information included in the latest behavior log information from any of the log information generation servers 10-1o and 10-2o is detected as the most-delayed server latest log time DT.

It is assumed, for example, that the most-delayed server latest log time DT thus detected is 12:59:00 and that the collection reference time RT is set to 12:58:00 on the basis thereof.

If the collection reference time RT is set as described above, the behavior log information including the behavior time information therebefore is collected. Accordingly, after the behavior log information is collected with the collection reference time RT being set to 12:58:00, as illustrated in FIG. 10, the behavior log information before 12:58:00 does not exist in the storing unit 20.

At this time, the pieces of behavior log information from the log information generation servers 10-1o and 10-2o are not newly stored, namely, the behavior log information whose behavior time at is after the most-delayed server latest log time DT=12:59:00 is not stored. Hence, also at the time of next collection, the most-delayed server latest log time DT remains 12:59:00 and the collection reference time RT remains 12:58:00 without being updated.

As a result, at the time of collections after the first collection with the collection reference time RT being set to 12:58:00, the situation where behavior log information to be collected, that is, the behavior log information before 12:58:00 does not exist continues. Consequently, the behavior log information collection becomes stagnant.

In view of the above, in the present embodiment, the changeover completion judgment processor 21c and the changeover completion-time handling processor 21d illustrated in FIG. 8 prevents the problem that the behavior log information collection becomes impossible after the completion of the DNS changeover.

In FIG. 8, the changeover completion judgment processor 21c judges whether or not any of the log information generation servers 10 stops transmitting the behavior log information along with the DNS changeover. Specifically, in this example, in the situation where the behavior log information is repetitively collected at intervals of a predetermined time as described above, the changeover completion judgment processor 21c judges whether or not the most-delayed server latest log time DT is the same time a predetermined number of times in a row, to thereby judge whether or not any of the log information generation servers 10 stops transmitting the behavior log information along with the DNS changeover.

Note that it goes without saying that a similar result can be obtained even by judging whether or not the collection reference time RT is the same time a predetermined number of times in a row.

On this occasion, the condition of "a predetermined number of times in a row" is added in consideration of the possibility that the most-delayed server latest log time DT can be the same time in a row even before the completion of the DNS changeover.

In the case where it is judged that the most-delayed server latest log time DT is the same time the predetermined number of times in a row, that is, in the case where it is judged that any of the log information generation servers 10 stops transmitting the behavior log information along with the DNS changeover, the changeover completion-time handling processor 21d collects the behavior log information transmitted by the log information generation server 10 for which the most-delayed server latest log time DT is detected, from among the pieces of behavior log information stored in the storing unit 20, and excludes this log information generation server 10 from the detection targets of the most-delayed server latest log time DT by the time detection processor 21a.

For example, in the example of FIG. 10, "the log information generation server 10 for which the most-delayed server latest log time DT is detected" is the log information generation server 10-1o. Accordingly, in this case, the changeover completion-time handling processor 21d collects the behavior log information transmitted by the log information generation server 10-1o, and excludes the log information generation server 10-1o from the detection targets of the most-delayed server latest log time DT by the time detection processor 21a.

Consequently, at the time of next collection, the time represented by the behavior time information included in the latest behavior log information transmitted by the log information generation server 10-2o is detected as the most-delayed server latest log time DT. Hence, the collection reference time RT is updated, and the behavior log information collection from the storing unit 20 is restarted.

Note that, in this case, at the time of collection after the next collection, the most-delayed server latest log time DT is no longer updated from the time represented by the behavior time information included in the latest behavior log information transmitted by the log information generation server 10-2o, and the changeover completion judgment processor 21c and the changeover completion-time handling processor 21d deal with this in the following manner. In response to that the changeover completion judgment processor 21c judges that the most-delayed server latest log time DT is no longer updated as described above, the changeover completion-time handling processor 21d collects the behavior log information transmitted by the log information generation server 10-2o, and excludes the log information generation server 10-2o from the detection targets of the most-delayed server latest log time DT. At the time of the subsequent collections, any of the log information generation servers 10-1n and 10-2n of the new system becomes the most-delayed server, and hence the non-updated state of the most-delayed server latest log time DT along with the completion of the DNS changeover (namely, the state where the collection reference time RT is not updated) does not occur. Accordingly, the stagnation of the behavior log information collection along with the completion of the DNS changeover does not occur thereafter.

As described above, in the case where any of the log information generation servers 10 stops transmitting the behavior log information along with the DNS changeover, the behavior log information transmitted by at least "the log information generation server 10 for which the most-delayed server latest log time DT is detected" is collected from among the pieces of behavior log information stored in the storing unit 20, and this log information generation server 10 is excluded from the detection targets of the most-delayed server latest log time DT by the time detection processor 21*a*. In this way, the stagnant state of the behavior log information collection can be prevented from continuing.

In this case, however, if only the behavior log information transmitted by "the log information generation server 10 for which the most-delayed server latest log time DT is detected" is collected as in the above-mentioned example, in the case where the time represented by the behavior time information included in the latest behavior log information transmitted by another log information generation server 10 of the old system is detected as the most-delayed server latest log time DT, the behavior log information collection unfavorably becomes stagnant again. That is, in the example of FIG. 10, the behavior log information collection becomes stagnant in the case where the time represented by the behavior time information included in the latest behavior log information transmitted by the log information generation server 10-1*o* is detected as the most-delayed server latest log time DT. After that, the behavior log information collection unfavorably becomes stagnant again in the case where the time represented by the behavior time information included in the latest behavior log information transmitted by the log information generation server 10-2*o* is detected as the most-delayed server latest log time DT.

In view of the above, in the case where it is judged that any of the log information generation servers 10 stops transmitting the behavior log information along with the DNS changeover, the changeover completion-time handling processor 21*d* of the present embodiment collects not only the behavior log information transmitted by "the log information generation server 10 for which the most-delayed server latest log time DT is detected" but also the behavior log information transmitted by every log information generation server 10 of the old system. In addition, the changeover completion-time handling processor 21*d* excludes not only "the log information generation server 10 for which the most-delayed server latest log time DT is detected" but also every log information generation server 10 of the old system from the detection targets of the most-delayed server latest log time DT.

This can suppress the stagnation of the behavior log information collection along with the completion of the DNS changeover to only once.

Accordingly, the behavior history information can be promptly generated.

<5. Processing Procedures>

Next, specific processing procedures for achieving the above-mentioned functions of the controlling unit 21 are described with reference to a flowchart of FIG. 11.

Figure 11:
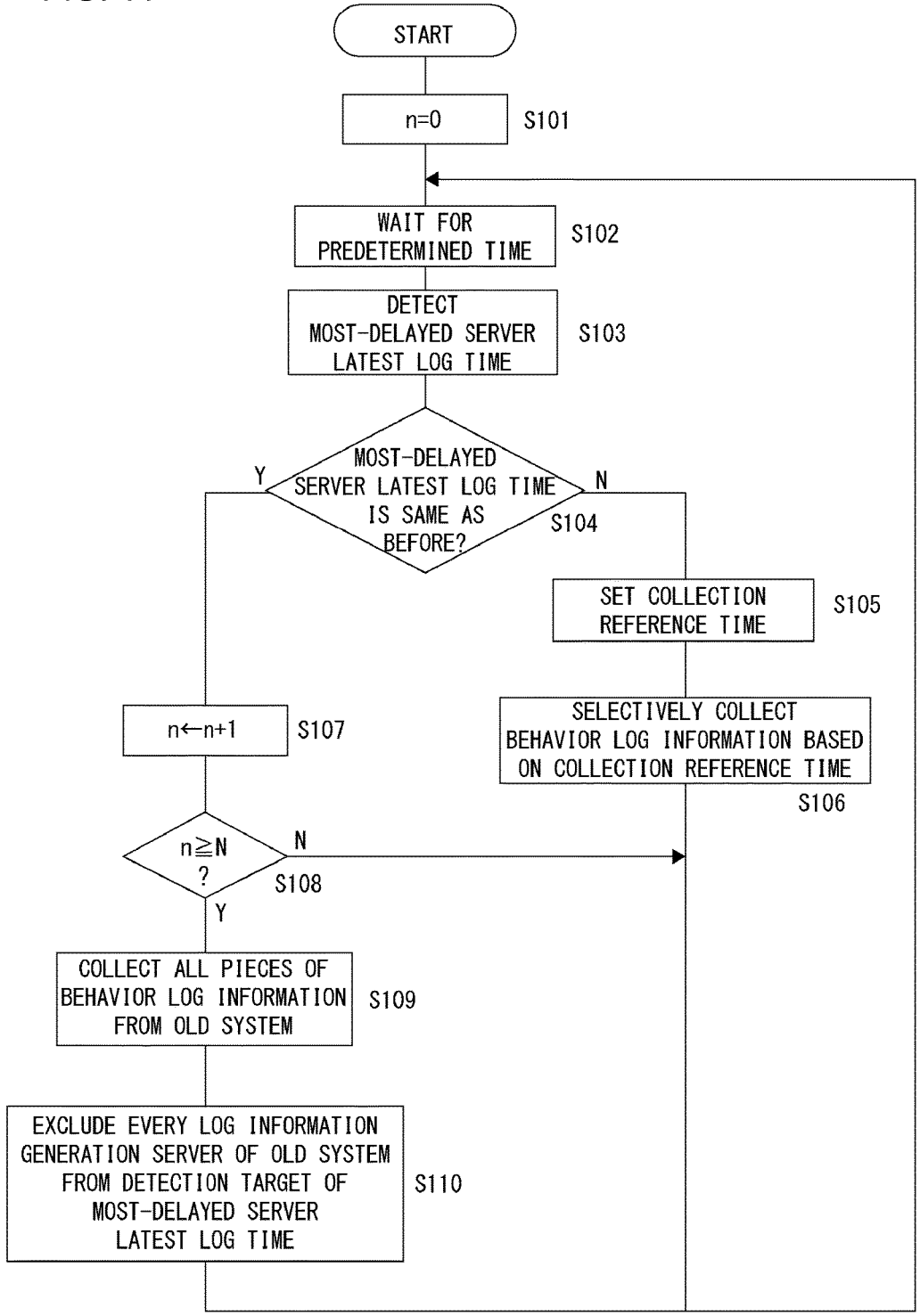
FIG. 11 is a flowchart illustrating specific processing procedures for achieving the functions of the controlling unit.

In FIG. 11, in Step S101, the controlling unit 21 resets a count value n to 0. The count value n is a value for counting the number of times that the most-delayed server latest log time DT is the same time in a row.

In Step S102, the controlling unit 21 waits for a predetermined time. In Step S103, the controlling unit 21 detects the most-delayed server latest log time DT. That is, the controlling unit 21 detects the most-delayed server latest log time DT on the basis of the pieces of behavior log information and the transmitter server IDs respectively associated with the pieces of behavior log information stored in the storing unit 20.

In response to the detection of the most-delayed server latest log time DT, in Step S104, the controlling unit 21 judges whether or not the most-delayed server latest log time DT is the same as the previous time.

If the controlling unit 21 judges that the most-delayed server latest log time DT is not the same as the previous time, the controlling unit 21 proceeds to Step S105, and sets the collection reference time RT. In Step S106, the controlling unit 21 performs a selective collection process of the behavior log information on the basis of the collection reference time RT. That is, the controlling unit 21 collects the behavior log information including the behavior time information before the collection reference time RT, from among the pieces of behavior log information stored in the storing unit 20.

In response to the execution of the selective collection process in Step S106, the controlling unit 21 returns to Step S102. In this way, Step S103 and the subsequent steps are repeated at intervals of a predetermined time.

On the other hand, if the controlling unit 21 judges, in Step S104, that the most-delayed server latest log time DT is the same as the previous time, the controlling unit 21 proceeds to Step S107, and increments the count value n (n←n+1). Then, the controlling unit 21 judges whether or not the count value n is equal to or more than an upper limit value N. In this way, the controlling unit 21 judges whether or not the most-delayed server latest log time DT is the same N times in a row. Note that N is a natural number equal to or more than 2.

If the controlling unit 21 judges, in Step S108, that the count value n is not equal to or more than the upper limit value N, the controlling unit 21 returns to Step S102, and waits for a predetermined time.

Just for confirmation, if the most-delayed server latest log time DT is the same as the previous time, the behavior log information has already been collected using the collection reference time RT set on the basis of this most-delayed server latest log time DT, and hence, in this case, behavior log information to be collected does not exist in the storing unit 20. Accordingly, as described above, the controlling unit 21 returns to Step S102 without performing Steps S105 and S106.

On the other hand, if the controlling unit 21 judges, in Step S108, that the count value n is equal to or more than the upper limit value N, the controlling unit 21 proceeds to Step S109, and collects all the pieces of behavior log information from the old system. That is, the controlling unit 21 collects the behavior log information transmitted by every log information generation server 10 (in this example, 10-1*o* and 10-2*o*) of the old system, from among the pieces of behavior log information stored in the storing unit 20.

Then, in Step S110, the controlling unit 21 excludes every log information generation server 10 of the old system from the detection targets of the most-delayed server latest log time DT, and returns to Step S102.

In order to judge whether or not any of the log information generation servers 10 stops transmitting the behavior log information along with the DNS changeover, in the above-mentioned example, it is judged whether or not the most-delayed server latest log time DT is the same time a predetermined number of times (N times) in a row. Alternatively, as described above, it may be judged whether or not the collection reference time RT is the same time a predetermined number of times in a row.

In the case of the judgment using the collection reference time RT, the process of setting the collection reference time RT (S105) may be provided between the judging process in Step S104 and the process of detecting the most-delayed server latest log time DT in Step S103, and the judging process in Step S104 may be changed to a process of judging whether or not the collection reference time RT is the same as the previous time. In this case, however, even in the case where the collection process in Step S106 is unnecessary, the process of setting the collection reference time RT is performed, and hence the judgment using the most-delayed server latest log time DT is more preferable from the perspective of preventing an unnecessary process.

<6. Conclusion of Embodiment>

As described above, the information processing device (behavior history information generation server 11) of the present embodiment includes: the storing unit 20 that temporarily stores the pieces of behavior log information respectively transmitted by the plurality of log information generation servers 10, in association with the transmitter server ID (server identification information) for identifying each log information generation server 10 that transmits the corresponding behavior log information; the behavior history information generating unit 22 that generates the behavior history information representing the history of user's behaviors, on the basis of the behavior log information collected from the storing unit 20; and the controlling unit 21.

Then, the controlling unit 21 performs: the time detection process in which the time represented by the behavior time information included in the latest behavior log information transmitted by the log information generation server 10 that is the most delayed in behavior log information transmission (namely, the oldest time of the times represented by the pieces of behavior time information included in the pieces of latest behavior log information respectively transmitted by the log information generation servers 10) is detected as the most-delayed server latest log time DT on the basis of the pieces of behavior log information and the transmitter server IDs stored in the storing unit 20; and the selective collection process in which the collection reference time RT based on the most-delayed server latest log time DT detected in the time detection process is set, and behavior log information including behavior time information before the collection reference time RT is selectively collected from among the pieces of behavior log information stored in the storing unit 20.

This prevents newly collected behavior log information from including behavior log information at a behavior time to be managed for already generated behavior history information.

Accordingly, for example, in the case where the information processing device is caused to generate the behavior history information on the basis of the pieces of behavior log information respectively generated and transmitted by the plurality of log information generation servers 10 in order to prevent log collection omission at the time of the DNS changeover as in this example, the already generated behavior history information does not need to be modified, and a reduction in processing load can be achieved.

Moreover, in the information processing device of the present embodiment, the controlling unit 21 performs: the changeover completion judging process in which it is judged whether or not any of the log information generation servers 10 stops transmitting the behavior log information along with the DNS changeover; and the changeover completion-time handling process in which, if it is judged in the changeover completion judging process that any of the log information generation servers 10 stops transmitting the behavior log information, the behavior log information transmitted by the log information generation server 10 for which the most-delayed server latest log time DT is detected is collected from among the pieces of behavior log information stored in the storing unit 20, and this log information generation server 10 is excluded from the targets of the time detection process.

This can resolve the stagnation of the behavior log information collection that occurs when the pieces of behavior log information from the log information generation servers 10 of the old system are no longer accumulated in the storing unit 20 due to the completion of the DNS changeover.

Accordingly, it is possible to prevent the problem that the behavior history information of the user cannot be properly generated at the time of the transition from the old system to the new system.

Further, in the information processing device of the present embodiment, in the changeover completion-time handling process, the controlling unit 21 collects the behavior log information transmitted by every log information generation server 10 of the old system, and excludes every log information generation server 10 of the old system from the targets of the time detection process.

This can suppress the stagnation of the behavior log information collection along with the completion of the DNS changeover to only once, in the case where the number of the log information generation servers 10 of the old system is more than one.

Accordingly, the behavior history information can be promptly generated.

Furthermore, in the information processing device of the present embodiment, in the changeover completion judging process, the controlling unit 21 judges whether or not one of the most-delayed server latest log time DT and the collection reference time RT is the same time a predetermined number of times in a row.

This eliminates the need for an additional process of monitoring the status of transmission from each log information generation server 10, in order to judge whether or not any of the log information generation servers 10 stops transmitting the behavior log information along with the DNS changeover.

Accordingly, a reduction in processing load can be achieved.

<7. Program and Storage Medium>

Hereinabove, the behavior history information generation server 11 as the embodiment of an information processing device according to the present invention has been described, and a program of the embodiment is a program causing an information processing device (such as a CPU) to perform processing of, particularly, the controlling unit 21 of the behavior history information generation server 11.

The program of the embodiment is a program causing an information processing device to perform processing, the information processing device including: the storing unit 20 that temporarily stores the pieces of behavior log information respectively transmitted by the plurality of log information generation servers 10, in association with the transmitter server ID (server identification information) for identifying each log information generation server 10 that transmits the corresponding behavior log information; and the behavior history information generating unit 22 that generates the behavior history information representing the history of user's behaviors, on the basis of the behavior log information collected from the storing unit 20. The program causes the information processing device to perform: the time detection process in which the time represented by the behavior time information included in the latest behavior log information transmitted by the log information generation server 10 that is the most delayed in behavior log information transmission (namely, the oldest time of the times represented by the pieces of behavior time information included in the pieces of latest behavior log information respectively transmitted by the log information generation servers 10) is detected as the most-delayed server latest log time DT on the basis of the pieces of behavior log information and the transmitter server IDs stored in the storing unit 20; and the selective collection process in which the collection reference time RT based on the most-delayed server latest log time DT detected in the time detection process is set, and behavior log information including behavior time information before the collection reference time RT is selectively collected from among the pieces of behavior log information stored in the storing unit 20.

That is, this program corresponds to a program causing the information processing device (controlling unit 21) to perform the processing described with reference to FIG. 11.

Such a program enables achievement of the information processing device as the behavior history information generation server 11.

Such a program can be stored in advance in a HDD as a storage medium built in a device such as a computer device, a ROM in a microcomputer including a CPU, and the like.

Further, such a program can also be temporarily or permanently stored in a removable storage medium such as a semiconductor memory, a memory card, an optical disk, a magneto-optical disk, and a magnetic disk. Such a removable storage medium can be provided in the form of so-called packaged software.

Moreover, such a program can be installed from a removable storage medium onto a personal computer or the like, and can also be downloaded from a downloaded site via a network such as a LAN and the Internet.

<8. Modifications>

The present invention is not limited to the above-mentioned specific examples, and various modifications can be conceived therefor.

For example, in the above description, the present invention is applied to generation of the behavior history information about user's behaviors concerning an affiliate, but the present invention can be widely preferably applied to generation of the behavior history information about user's behaviors performed on a network.

Moreover, in the above description, one of the most-delayed server latest log time DT and the collection reference time RT is used in order to judge whether or not any of the log information generation servers stops transmitting the behavior log information along with the completion of the DNS changeover. Alternatively, as a matter of course, the transmission status of the behavior log information from each log information generation server 10 is monitored, whereby it can also be judged whether or not any of the log information generation servers stops transmitting the behavior log information. Specifically, for example, it is judged whether or not any of the log information generation servers 10 does not transmit the behavior log information for a predetermined time or longer, whereby it may be judged whether or not any of the log information generation servers stops transmitting the behavior log information along with the completion of the DNS changeover.

Further, in the above description, the collection reference time RT is set to a time that is older by a predetermined offset time than the most-delayed server latest log time DT, but may be set to the most-delayed server latest log time DT itself. The collection reference time RT may be set to a time that is at least equal to or older than the most-delayed server latest log time DT.

REFERENCE SIGNS LIST

1 network system, 2 network, 3 shopping site management system, 4 user terminal, 5 web server, 6, 6O, 6N affiliate management system, 10 log information generation server, 11 behavior history information generation server, 12 result reward management server, 20 storing unit, 21 controlling unit, 22 behavior history information generating unit, 21*a* time detection processor, 21*b* selective collection processor, 21*c* changeover completion judgment processor, 21*d* changeover completion-time handling processor.

What is claimed is:

1. An information processing device comprising:
   at least one memory configured to store computer program code; and
   at least one processor configured to access the at least one memory and operate according to the computer program code, said computer program code including:
   storing code configured to cause the at least one processor to temporarily store pieces of behavior log information respectively transmitted by a plurality of log information generation servers, in association with server identification information for identifying each log information generation server of the plurality of log information generation servers that transmits corresponding behavior log information, the plurality of log information generation servers each generating the behavior log information including at least behavior time information representing a first time of a user's behavior performed on a network, on a basis of access from an external device via the network;
   behavior history information generation code configured to cause the at least one processor to generate behavior history information representing a history of behaviors, on a basis of the behavior log information; and
   controlling code configured to cause the at least one processor to perform:
   a time detecting process for detecting a latest time as a most-delayed server latest log time from a plurality of second times represented by behavior time information contained in latest behavior log information of each of the plurality of log information generation servers, on the basis of the behavior log information and the server identification information that are stored by the storing code; and
   a selective collection process in which a collection reference time based on the most delayed server latest log time detected in the time detection process is set, and first behavior log information including first behavior time information before the collection reference time is selectively collected from among the pieces of behavior log information,
   wherein the plurality of log information generation servers include: a log information generation server of an old system that the external device no longer accesses along with domain name system (DNS) changeover; and a log information generation server of a new system that the external device accesses along with the DNS changeover.

2. The information processing device according to claim 1, wherein
   the controlling code is further configured to cause the at least one processor to perform:

a changeover completion judging process in which it is judged whether or not any of the plurality of log information generation servers stops transmitting the behavior log information along with the DNS changeover; and a changeover completion-time handling process in which, if it is judged in the changeover completion judging process that any of the plurality of log information generation servers stops transmitting the behavior log information, behavior log information transmitted by a first log information generation server for which the most-delayed server latest log time is detected is collected from among the pieces of behavior log information stored, and the first log information generation server is excluded from targets of the time detection process. server latest log time and the collection reference time is the same time a predetermined number of times in a row.

3. The information processing device according to claim 2, wherein in the changeover completion-time handling process, the controlling code is further configured to cause the at least one processor to collect behavior log information transmitted by every log information generation server of the old system, and to exclude every log information generation server of the old system from the targets of the time detection process.

4. The information processing device according to claim 2, wherein in the changeover completion judging process, the controlling code is further configured to cause the at least one processor to judge whether or not one of the most-delayed server latest log time and the collection reference time is the same time a predetermined number of times in a row.

5. An information processing method for an information processing device which includes a storing unit that temporarily stores pieces of behavior log information respectively transmitted by a plurality of log information generation servers, in association with server identification information for identifying each log information generation server of the plurality of log information servers that transmits corresponding behavior log information, the plurality of log information generation servers each generating the behavior log information including at least behavior time information representing a first time of a user's behavior performed on a network, on a basis of access from an external device via the network, and a behavior history information generating unit that generates behavior history information representing a history of behaviors, on a basis of the behavior log information that is collected from the storing unit, the information processing method comprising:

a time detection step in which a latest time is detected as a most-delayed server latest log time among a plurality of second times represented by behavior time information contained in latest behavior log information of each of the plurality of log information generation servers, on the basis of the behavior log information and the server identification information that are stored in the storing unit; and a selective collection step in which a collection reference time based on the most-delayed server latest log time detected in the time detection step is set, and first behavior log information including first behavior time information before the collection reference time is selectively collected from among the pieces of behavior log information stored in the storing unit, wherein the plurality of loci information generation servers include:

a log information generation server of an old system that the external device no longer accesses after a domain name system (DNS) changeover; and a log information generation server of a new system that the external device continues to access after the DNS changeover.

6. The information processing method according to claim 5, wherein the information processing method further comprising:

a changeover completion judging step in which it is judged whether or not any of the plurality of log information generation servers stops transmitting behavior log information along with the DNS changeover; and a changeover completion-time handling step in which, if it is judged in the changeover completion judging step that a first log information generation server of the plurality of log information generation servers stops transmitting the behavior log information, second behavior log information transmitted by the log information generation server for which the most-delayed server latest log time is detected is collected from among the pieces of behavior log information stored in the storing unit, and the first log information generation server is excluded from targets of the time detection step.

7. The information processing method according to claim 6, wherein in the changeover completion-time handling step, the controlling unit collects behavior log information transmitted by every log information generation server of the old system, and excludes every log information generation server of the old system from the targets of the time detection step.

8. The information processing method according to claim 6, wherein in the changeover completion judging step, the controlling unit judges whether or not one of the most-delayed server latest log time and the collection reference time is the same time a predetermined number of times in a row.

9. An information processing device comprising:

at least one memory configured to store computer program code; and at least one processor configured to access the at least one memory and operate according to the computer program code, said computer program code including:

storing code configured to cause the at least one processor to temporarily store pieces of log information respectively transmitted by a plurality of log information generation servers, in association with server identification information for identifying each log information generation server of the plurality of log information generation servers that transmits corresponding log information, the plurality of log information generation servers each generating the log information including at least time information representing a first time of access from an external device via the network, history information generation code configured to cause the at least one processor to generate history information, on a basis of the log information, and controlling code configure to cause the at least one processor to perform:

a time detecting process for detecting a latest time as a most-delayed server latest log time from a plurality of second times represented by time information contained in latest log information of each of the plurality of log information generation servers, on the basis of the log information and the server identification information that are stored by the storing code, and a selective collection process in which a collection reference time based on the most-delayed server latest log time detected in the time detection process is set, and first log information including first time information before the collection reference time is selectively collected from among the pieces of log information, wherein the plurality of log information generation servers include: a log information generation server of an old system that the external device no longer accesses along with domain name system (DNS) changeover; and a log information generation server of anew system that the external device accesses along with the DNS changeover.

10. The information processing device according to claim 9, wherein
the controlling code is further configured to cause the at least one processor to perform:
   a changeover completion judging process in which it is judged whether or not any of the plurality of log information generation servers stops transmitting the log information along with the DNS changeover; and
   a changeover completion-time handling process in which, if it is judged in the changeover completion judging process that any of the plurality of log information generation servers stops transmitting the log information, log information transmitted by a first log information generation server for which the most-delayed server latest log time is detected is collected from among the pieces of log information stored, and the first log information generation server is excluded from targets of the time detection process.

11. The information processing device according to claim 10, wherein
in the changeover completion-time handling process, the controlling code is further configured to cause the at least one processor to collect log information transmitted by every log information generation server of the old system, and to exclude every log information generation server of the old system from the targets of the time detection process.

12. The information processing device according to claim 10, wherein
in the changeover completion judging process, the controlling code is further configured to cause the at least one processor to judge whether or not one of the most-delayed server latest log time and the collection reference time is the same time a predetermined number of times in a row.

* * * * *